United States Patent [19]

Masuda

[11] 3,844,656

[45] Oct. 29, 1974

[54] PHOTO-COMPOSING MACHINE

[76] Inventor: Tatsunosuke Masuda, 41-4, Shimogama Kitashiba-cho, Sakyo-ky, Kyoto, Japan

[22] Filed: Dec. 4, 1972

[21] Appl. No.: 311,632

[52] U.S. Cl. .................................................... 355/53
[51] Int. Cl. ............................................ G03b 27/42
[58] Field of Search ............ 355/53, 54, 72, 73, 75, 355/76

[56] References Cited

UNITED STATES PATENTS

| | | | |
|---|---|---|---|
| 2,016,811 | 10/1935 | Barnstorff | 355/76 |
| 2,031,221 | 2/1936 | Mazzocco | 355/75 X |
| 3,472,591 | 10/1969 | Frohlich | 355/53 |
| 3,503,679 | 3/1970 | Kawarabayashi et al. | 355/53 |
| 3,746,444 | 7/1973 | Kahle et al | 355/54 X |

*Primary Examiner*—Fred L. Braun
*Attorney, Agent, or Firm*—Spensley, Horn and Lubitz

[57] ABSTRACT

A photo-composing machine having a register table on which a negative is registered to a predetermined position before the negative is loaded to a carriage which is adapted to move over a photosensitive member mounted on a platen of the machine. The carriage is so constructed that when it is set to the original point of its movement, it precisely registers with the register point of the negative on the register table.

1 Claim, 3 Drawing Figures

PHOTO-COMPOSING MACHINE

This invention relates to a photo-composing machine for preparing a printing plate by repeatedly exposing at least one image on a single large sheet of photosensitive member.

A photo-composing machine requires exactness of register of a negative or positive at its exposure position. Especially in color printing, several negatives of the subject to be duplicated are prepared, each one containing a separate color component of the subject; then each negative is mounted on a holder which is adapted to step over the appropriate plate for repeatedly exposing the image of the particular negative as many times as space of the plate permits. If each color negative is not precisely aligned with respect to the other color negative before exposure, the images are not exactly superimposed, then overlapping edges or distorsion will appear in the finished product of printing. It will be apparent, therefore, that the precise register of the negative holder when it is placed to its exposure positions and when it is loaded with each negative are critical steps in a printing process of this type. A conventional negative holder is so devised that it removably carries a glass plate on which a negative is loaded; and a register table is used to load the negative onto the glass plate at a predetermined position registering an appropriate mark and thereafter the negative-loaded glass plate is mounted on the negative holder at a predetermined position by practiced and skilled operation. Such process has, however, drawbacks in that sufficient efficiency is not obtained since it needs separate steps for precisely positioning the negative onto the glass plate and the glass plate onto the negative holder. Such process inevitably involves the necessity of equipments of a negative holder and a register table of precise complicated structure for ensuring the precise mounting of the glass plate on the negative holder and for loading the negative onto the glass plate. Obviously, the glass plate is not always devised for convenient use for such repeated mounting and dismounting operations with respect to the negative holder. Thus, there have been earnestly demanded for improvements in mounting the negative onto the negative holder in a photo-composing machine.

Accordingly, the present invention has its object to provide an improved photo-composing machine that automatically registers and mounts a negative onto a negative holder. Utilization of modern numerical controlling system will further elevate the efficiency of operation according to the machine of the invention. The present invention is of course applicable to manually operated step and repeat printers.

The novel features, organization and method of operation, together with further objects and advantages of the invention will be better understood from the following description in connection with the accompanying drawings in which a preferred embodiment of the invention is illustrated.

In the drawings, FIG. 1 is a plan view of an improved step-and-repeat photo-composing machine;

Figure 3:
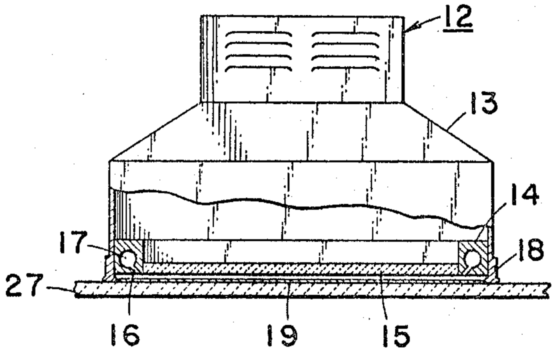
FIG. 3 is an enlarged elevation, partly in section, of a carriage before it picks a negative from a light table.

In the drawings, numeral 10 is applied to a machine frame having a stationary platen 11 for mounting thereon a printing plate or similar photosensitive member (not shown). Element 12 is carriage which comprises a housing 13 containing a light source (not shown). The carriage 12 has a frame 14 generally of a rectangular configuration for supporting a glass plate 15 (FIG. 3) adapted to load on the underside thereof a negative or a positive of the subject to be duplicated. In this connection, a plurality of ports 16 are provided on the underside of frame 14. The ports 16 are connected to a conduit 17 in the frame 14, which conduit in turn is connected to a source of vacuum. Provided along the periphery of the frame 14 is a rubber skirt 18. When a vacuum is applied to the conduit 17, suction is created at the site of port 16 which attaches the negative 19 to the glass plate 15.

The carriage 12 is carried by a pair of beam members 20 extending between a pair of frame members 21 which are rigidly connected to each other to form an integral rigid structure. Each frame member 21 has a rail 22 which extends in direction perpendicular to the longitudinal direction of the machine frame 10. The beam members 20 are provided at their both ends with wheels 23 which are adapted to wheel on the rails 22, respectively.

The machine frame 10 is provided with rails 24 which extend in the longitudinal direction or the X-axis of the machine and are adapted to bear the wheels 25 of the frame members 21 of carriage 12. The frame members 21 are moved along the X-axis via rails 24 by motor means 26 which may be a pulsed stepping motor numerically controlled. The carriage 12 is also moved by similar motor means along the Y-axis via rails 22.

Figure 1:
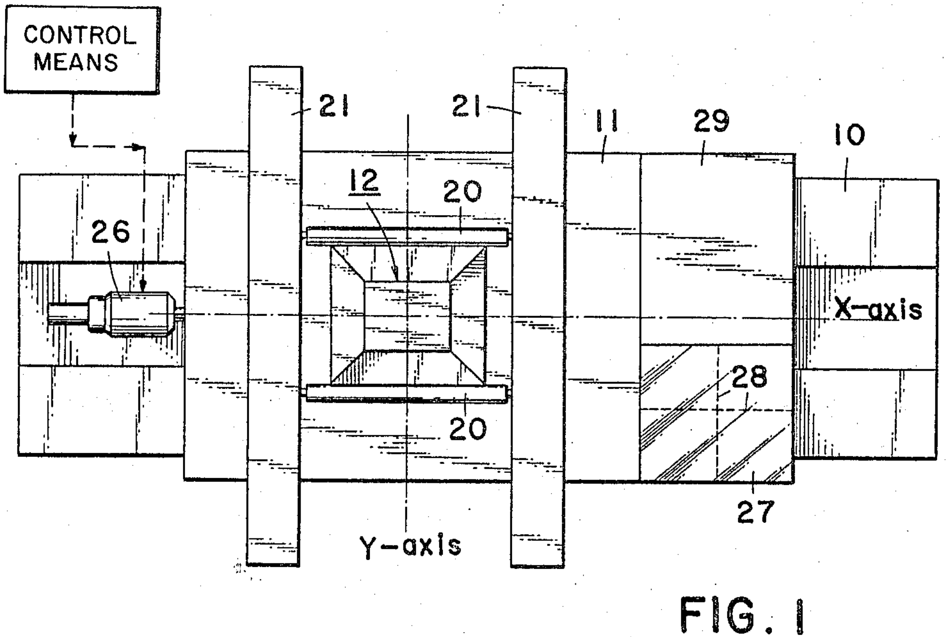
Figure 2:
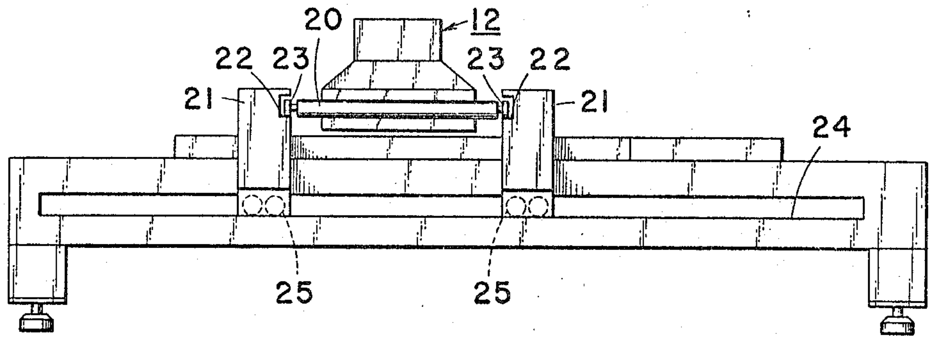
FIG. 2 is an elevational view of the machine of FIG. 1.

The platen 11 according to the machine of the invention is provided, as a substantial extension of the platen, with a light table 27. In the illustrated embodiment, the light table 27 is positioned on the right lower portion of the platen 11 in FIG. 1. The light table 27 has cross lines 28, the point of which intersection providing a register mark. This point of intersection also provides the origin of movement of the carriage 12 or the original point (O,O) of the coordinates in the numerical control for the movement of carriage 12 on the platen 11. The carriage 12 is so constructed and arranged that when it is set to move to the original point of movement, it automatically positions itself directly above the light table 27 until the center of carriage 12 is precisely in register with the point of intersection of cross lines 28.

The platen 11 is preferably provided with another extension 29 adjacent to the light table 27, which extension being used to unload thereat the used negative from the carriage 12.

In operation, a first negative containing one color component of the subject to be duplicated is manually registered on the light table 27. Then the carriage 12 is driven to move to the original point of its movement above the light table 27. When the carriage 12 and the light table 27 are in register, a suitable switch is activated to lower the carriage until the glass plate 15 rests on the negative 19 on the table 27 and suction is applied to the negative through ports 16, thereby allowing the carriage 12 to lift the negative 19 from the light table 27. Next the carriage 12 carrying the negative 19 is positioned over the photosensitive plate on the platen 11 by means of motor means 26 controlled by a conventionally programmed numerical control system, then the carriage 12 starts its movement in directions along the Y-axis and the X-axis exposing the sensitized plate through the negative. Whilst, the operator can place a second negative containing a separate color component of the subject in register with the mark or the point of intersection of cross lines 28 on the light table 27. This means that the second negative is precisely registered on the light table with the corresponding point on the first negative that go to make up the photocomposed image with the second negative.

When the required exposures of the first negative has been completed, the carriage 12 discharges the negative at position 29. The carriage 12 then is moved again to the original point above the light table 27 and picks the second negative; and the procedure is repeated. This cycle is repeated to a third and/or fourth negative.

When the negatives are too short in size to be sucked by the ports 16, a suitable transparent sheet of larger size may be used to cover the negative from the underside thereof so that the negative may be indirectly carried by the suction of the sheet.

It is apparent from the foregoing description that each color negative may be automatically loaded to the carriage at a predetermined position so that it precisely aligns with respect to the other color negatives.

Although this invention has been disclosed and illustrated with reference to one embodiment, the principles involved are susceptible of various other modifications and changes which will be apparent to persons skilled in the art. For example, the register and alignment of the negatives may be accomplished by engagement of holes in the negative and pins on a table substituted for the light table as shown. The invention is applicable to vertical step and repeat machines, both automatic and manually operated machines.

What I claim is:

1. In a photo-composing machine comprising:

a. a platen for receiving a photo sensitized member;

b. a carriage for receiving a least one negative or positive of a subject, to be duplicated;

c. means for moving said carriage relative to said platen, in response to control signals to predetermined positions on said photo sensitized member for multiple exposures of said member;

d. a means for automatically registering and loading at least said negative or positive onto said carriage comprising;

1. a light table as a substantial extension of said platen; said light table having cross lines thereon;
2. a register point provided by said cross lines for at least said negative or positive on said light table for providing a point of origin for movement of said carriage; and
3. a vacuum means in said carriage for picking up at least said negative or positive from said table;

whereby, said carriage can be positioned above said table and said point of origin in response to said control signal, pick up said negative or positive and then transmit said negative or positive to predetermined positions over said platen for multiple exposures of said member.

* * * * *